United States Patent Office 3,817,881
Patented June 18, 1974

---

3,817,881
FLAME RETARDANT POLYURETHANE FOAM
Richard J. Turley, Orange, Conn., assignor to
Olin Corporation
No Drawing. Continuation-in-part of abandoned application Ser. No. 251,844, May 5, 1972, which is a division of application Ser. No. 8,040, Feb. 2, 1970, now Patent No. 3,707,586. This application Mar. 12, 1973, Ser. No. 340,277
Int. Cl. C08g 22/44, 51/58
U.S. Cl. 260—2.5 AJ                                  20 Claims

ABSTRACT OF THE DISCLOSURE

Flame retardant polyurethane foams are prepared from compositions containing as flame retardant additives, a select group of halogenated phosphate esters.

---

This application is a continuation-in-part of U.S. application Ser. No. 251,844, filed May 5, 1972, now abandoned, and which in turn is a division of U.S. application Ser. No. 8,040, filed Feb. 2, 1970, now Pat. 3,707,586.

This invention relates to a polyurethane foam composition. More particularly, the invention relates to the use of a select group of halogenated phosphate esters as additives in making flame retardant polyurethane foam.

The wide range of utiliity of polyurethane foam has been somewhat circumscribed by its flammability. Consequently, numerous efforts have been made in recent years to develop ways of imparting flame-retardancy to the foam. Such efforts have produced a variety of fire suppressant or flame-retardant compounds which are either incorporated in the polyurethane pre-polymer mix or applied to the polyurethane after foaming. See for example U.S. Pats. Nos. 3,157,613, No. 3,192,242, and No. 3,255,145.

The success of a flame-retardant additive for polyurethane foam depends on its meeting at least three requirements. It must first have not detrimental effect on the foam, nor considerably alter the basic properties of the foam. Secondly, it must be relatively easy to produce or obtain and economically feasible to use in the manufacture of foam. Thirdly, the additive must not be fugitive. The term "fugitive" is used to describe a compound whose flame-retardant effectivensss is greatly diminished when foam containing it is subjected to aging.

Many of the flame-retardant additives developed in the art have been found unsatisfactory inasmuch as they do not measure up to all of the above requirements, particularly the last one. As an illustration, a well-known additive, tris(2-chloroethyl) phosphate, is initially effective as a flame-retardant when formulated in a flexible polyurethane foam-forming reaction mixture. However, when the foam is subjected to aging, the flame-retardant effectiveness of the additive is diminished considerably.

It is the primary object of this invention to provide an improvement in the art of flame retardant polyurethane foam. A more specific object is to provide a new polyurethane foam composition comprising a flame retardant additive which is free of the drawbacks referred to above. These and other objects will become apparent from the following description.

It has now been found, in accordance with this invention, that flame retardant polyurethane foam can be prepared from a composition comprising a halogenated phosphate diester of the formula

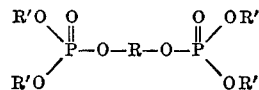

wherein R is an aliphatic hydrocarbon radical or an aromatic hydrocarbon radical, and each R' is independently a haloalkyl radical.

The polyurethane foams of the invention, incorporating a diester of formula I above, have been found to possess a high degree of flame retardancy, according to the flammability test described in ASTM-D1692-68, and generally this flame retardancy is not substantially diminished by aging of the foam.

The halogenated phosphate diesters of formula I which are employed according to the invention can be prepared by a method which is now known in the art. See for example U.S. Pat. 3,707,586 which issued on Dec. 26, 1972. This comprises reacting, at a temperature below about 60° C. and at atmospheric pressure, the appropriate bis(haloalkyl) phosphorohalidate with the appropriate diol as illustrated in equation II below $$2(R'O)_2POX + R(OH)_2 \rightarrow I + HCl \qquad II$$

wherein X is a halogen, e.g., chlorine, and R and R' have the significance indicated above. In accordance with this equation, for example, tetrakis (2-chloroethyl) ethylene diphosphate can be prepared by reacting bis(2-chloroethyl) phosphorochloridate with ethylene glycol.

The bis(haloalkyl) phosphorohalidate in equation II which is utilized to prepare the phospate diesters can in turn be prepared by reacting the appropriate phosphoryl trihalide with an alkylene oxide in the presence of a basic catalyst. This process of preparing the phosphorohalidate is described in detail in U.S. Pat. No. 2,866,809, issued Dec. 30, 1958, which patent is incorporated herein by reference.

In accordance with the invention, any halogenated phosphate diester of formula I, or a mixture of such diesters, is incorporated in a polyurethane foam forming reaction mixture to impart flame retardant properties to the resulting foam. As indicated above, the radical R in formula I can be an aliphatic hydrocarbon radical or an aromatic hydrocarbon radical both of which are free of halogen substituents. The aliphatic hydrocarbon radical, which may have one or more double-bond unsaturations, usually contains from 1 to about 8 carbon atoms; and the aromatic radical usually contains from 6 to about 14 carbon atoms. Illustrative such radicals include for example methylene, ethylene, propylene, butylene, heptylene, octylene, phenylene, butene, heptene, naphthylene, anthrylene, tolulene, ethyl phenylene xylylene and so forth. It is thus apparent that the term "aromatic radical" as used in the specification and claims herein is intended to include any radical having an aromatic ring and thus encompasses aromatic-aliphatic radicals such as ethyl phenylene.

However, it is preferred to employ those diesters of formula I wherein R represent an aliphatic hydrocarbon radical having 1-4 carbon atoms, such as ethylene and propylene, or an aromatic hydrocarbon radical having 6-10 carbon atoms such as phenylene and toluene. Particularly preferred for use according to the invention are those diesters of formula I wherein R represents an aliphatic radical having 2–4 carbon atoms or phenylene, the former, i.e., the aliphatic radical, being most preferred.

Each of the haloalkyl radicals represented by R' in formula I contains from 1 to about 4, and preferably 1–3, halogen atoms, the halogen being chlorine, bromine, or a mixture thereof. Thus the term "haloalkyl radical," as used in the specification and claims herein, is intended to mean any alkyl radical having from 1 to 4 halogen substituents selected from the group consisting of chlorine, bromine or a mixture thereof. These radicals usually contain from 1 to about 8, and preferably 1–4, carbon atoms. It is generally also more preferred to employ those diesters of formula I wherein each of the haloalkyl radicals R' contains 1 or 2 halogen atoms, the monohaloalkyl radicals being most preferred.

Illustrative of the haloalkyl radicals represented by each of R' in formula I include 2-chloroethyl
2-bromoethyl
2-chloropropyl
2-bromopropyl
2-chloroisopropyl
2,3-dichloropropyl
2,3-dibromopropyl
2-bromoisopropyl
2,2'-dichloroisopropyl
2,2'-dibromoisopropyl
1,4,4,4-tetrachloro-2-butyl
1,4,4,4-tetrabromo-2-butyl
1-bromo-4,4,4-trichloro-2-butyl
2,4,4,4-tetrachlorobutyl
2,4,4,4-tetrabromobutyl Illustrative diesters of formula I which are employed according to the invention include for example tetrakis(2-chloroethyl) ethylene diphosphate
tetrakis(2-chloroisopropyl) ethylene diphosphate
tetrakis(2-chloroethyl) p-phenylene diphosphate
tetrakis(2-chloroethyl) m-phenylene diphosphate
tetrakis(2-bromoethyl) ethylene diphosphate
tetrakis(2-chloroethyl)-2-butene-1,4-diphosphate
tetrakis(2-bromoisopropyl) ethylene diphosphate
tetrakis(2,3-dichloropropyl) ethylene diphosphate
tetrakis(2,3-dibromopropyl) ethylene diphosphate
tetrakis(2-bromoethyl)-2-butene-1,4-diphosphate
tetrakis(2-chloroethyl)-butylene-1,4-diphosphate
bis(2-chloroethyl)bis(2-bromoethyl) ethylene diphosphate
bis(2-chloroethyl)bis(2-bromoethyl) ethylene diphosphate phate
chloroethyl bromoethyl 2-[chloroethyl bromomethyl phosphoro-]ethyl phosphate Although all such diesters as illustrated above are of utility according to the invention, in the most preferred embodiments of the invention, those diesters of formula I are utilized in which all of the haloalkyl radicals R' are identical, e.g., the tetrakis(haloalkyl) diphosphates.

According to the invention, the diesters of formula I are utilized as flame retardants in flexible, semi-rigid and rigid polyurethane foam compositions. In preparing the polyurethane foams of the invention, either the so-called "one-shot method" or the "prepolymer technique" may be employed. Any combination of polyols, including polyether polyols and polyester polyols, organic polyisocyanate, foaming agent, catalyst and other reactants capable of forming a flexible urethane foam can be employed, and the term "polyurethane foam composition" in the specification and claims herein is intended to include the product of any such combination. Typical formulations are described in U.S. Pat. No. 3,072,582, issued Jan. 8, 1963 and Canadian Pat. No. 705,938, issued Mar. 16, 1965.

While, as indicated above, both polyether and polyester polyols can be employed in the practice of this invention, preferred embodiments utilize polyether polyols in the preparation of the polyurethane foam forming reaction mixture. Any suitable polyether polyol may be used for this purpose. These polyether polyols usually have a hydroxyl number for example from about 25 to about 800.

The polyether polyols include for example oxyalkylated polyhydric alcohols having a molecular weight range of about 200–10,000 and preferably between about 250–8,000. These oxyalkylated polyhydric alcohols are generally prepared by methods well known in the art such as reacting, in the presence of an alkaline catalyst, a polyhydric alcohol and an alkylene oxide such as ethylene oxide, propylene oxide, butylene oxide, amylene oxide, epichlorohydrin, and mixtures of these alkylene oxides, using either random or step-wise addition.

Polyhydric alcohols suitable for use in preparing the polyether polyols include ethylene glycol, pentaerythritol, methyl glucoside, propylene glycol, 2,3-butylene glycol, 1,3-butylene glycol, 1,5-pentane diol, 1,6-hexane diol, glycerol, trimethylolpropane, sorbitol, sucrose, dextrose, mixtures thereof and the like. If desired, a portion or all of the polyhydric alcohol may be replaced with another compound having at least two reactive hydrogen atoms, such as alkyl amines, alkylene polyamines, cyclic amines, amides, and polycarboxylic acids. Suitable alkyl amines and alkylene polyamines include methylamine, ethylamine, propylamine, butylamine, hexylamine, ethylenediamine, 1,6-hexanediamine, diethylenetriamine, and the like. Also, such cylic amines as piperazine, 2-methylpiperazine and 2,5-dimethylpiperazine can also be used. Amides, such as acetamide, succinamide and benzenesulfonamide, constitute a further class of such reactive hydrogen compounds. A still further class of such reactive hydrogen compounds is the di- and polycarboxylic acids, such as adipic acid, succinic acid, glutaric acid, aconotic acid, diglycollic acid, and the like. It will be recognized that the reactive hydrogen compound can be one containing different functional groups having reactive hydrogen atoms, such as citric acid, glycollic acid, ethanolamine, and the like. Aromatic polyamines such as toluene diamine may also be employed. Mixtures of oxyalkylated polyhydric alcohols are also suitable for use in the process of this invention.

Although as indicated above, the polyurethane foams of the invention can be flexible, semi-rigid, or rigid, the flexible foams are preferred. Therefore in preparing the polyurethane foam in accordance with this preferred embodiment of the invention, an oxyalkylated polyhydric alcohol is used having a molecular weight of about 2000–7000 and more preferably about 2500–6000.

The organic polyisocyanates used in the preparation of the polyurethane foams include toluene diisocyanate, such as the 4:1 mixture or the 65:35 mixture of the 2,4- and 2,6-isomers, ethylene diisocyanate, propylene diisocyanate, methylene-bis-4-phenyl isocyanate, 3,3'-bitoluene-4,4'-diisocyanate, hexamethylene diisocyanate, naphthalene - 1,5-diisocyanate, polyphenylene polymethylene isocyanate, mixtures thereof and the like. The preferred organic polyisocyanate is toluene diisocyanate. The amount of isocyanate employed in the process of this invention should be sufficient to provide at least about 0.7 NCO group per hydroxyl group present in the reaction system, which includes the polyol as well as any additive or foaming agent employed. An excess of isocyanate compound may be conveniently employed; however, this is generally undesirable due to the high cost of the isocyanate compounds. It is preferable, therefore, to employ sufficient isocyanate to provide no greater than about 1.25 NCO groups per hydroxyl group, and preferably between about 0.9 and about 1.15 NCO groups per hydroxyl group. The ratio of NCO to OH groups times 100 is referred to as the "index."

The polyurethane foams are prepared in the presence of a foaming agent which may be any of those known to be useful for this purpose. Illustrative are water and organic foaming agents containing up to about seven carbon atoms such as the halogenated hydrocarbons, lower molecular weight alkanes, alkenes, ethers, and mixtures thereof. Typical halogenated hydrocarbons include, but are not limited to: monofluorotrichloromethane, dichlorofluoromethane, difluorodichloromethane, 1,1,2-trichloro-1,2,2-trifluoroethane, dichlorotetrafluoroethane, ethyl chloride, methylene chloride, chloroform, and carbon tetrachloride. Other useful foaming agents include lower molecular weight alkanes, alkenes and ethers such as methane, ethane, ethylene, propane, propylene, pentane, hexane, heptane, ethyl ether, diisopropyl ether, mixtures thereof, and the like. The amount of foaming agent employed may be varied within a wide range. Generally, however, the halogenated hydrocarbons are employed in an amount from about 1 to about 50, and preferably about 5–35, parts per 100 parts by weight of the polyol, and generally water is employed in an amount from about 1.0 to 6.0 parts by weight per 100 parts by weight of the polyol.

The polyurethane foams are prepared in the presence of a catalytic amount of a reaction catalyst. The catalyst employed may be any of the catalysts known to be useful for this purpose, such as tertiary amines and metallic salts, particularly stannous salts, and mixtures thereof. Typical tertiary amines include, but are not limited to, the following: N-ethyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octoate, and the like. Any catalytic proportion of catalyst or catalyst mixture may be employed such as between about 0.1 and about 3.0 percent, and preferably between about 0.5 and about 2.5 percent, by weight of the polyol.

It is preferred in the preparation of the polyurethane foams of the present invention to employ minor amounts of a conventional surfactant in order to further improve the cell structure of the polyurethane foam. Typical of such surfactants are the silicones, and the siloxaneoxyalkylene block copolymers. U.S. Pat. 2,834,748 and T. H. Ferrigno, *Rigid Plastic Foams* (New York: Reinhold Publishing Corp., 1963) pages 38–42, disclose various surfactants which are useful for this purpose. Generally up to 2 parts by weight of the surfactant are employed per 100 parts of the polyol.

In utilizing the diesters of formula I to prepare the polyurethane foam of the invention, they are usually added to the polyurethane foam-forming reaction mixture prior to foaming. Conveniently, they are first blended with the polyol component used in making the foam, and the blend is then added to the other ingredients of the polyurethane foam forming reaction mixture. The proportion of the diester which is used is not limited to any particular amount or range so long as its inclusion in the foam forming reaction mixture imparts flame retardancy to the foam without otherwise detrimentally affecting the other properties of the foam. Thus the term "flame retarding amount," as used in the claims herein, includes any such proportion. In practice, a proportion of the diester may be used which ranges from about 5 to about 30 parts per 100 parts by weight of total polyol employed in making the foam. However, higher as well as lower proportions may be used if desired. A particularly preferred proportion range is about 10–25 parts per 100 parts by weight of polyol.

The following examples are provided to illustrate the invention. In these examples, all parts and percentages given are by weight, unless otherwise specified. The first 6 examples deal with the preparation of various diesters of formula I for use according to the invention; and the remaining examples are directed to the use of such diesters in making flame retardent polyurethane foam.

EXAMPLE 1

To a solution of two moles of phosphorus trichloride, in 150 mls. of methylene chloride pre-treated with ten drops of ethylene chlorohydrin, a total of 6.9 moles of ethylene oxide were added at 40–60° C. The reaction product was reacted with gaseous chlorine until 1.65 moles of chlorine were consumed. A yield of 82.5 percent of bis(chloroethyl) phosphorochloridate was thus obtained. This product was then directly reacted with 0.8 mole of ethylene glycol in the presence of 1.6 moles of pyridine. This was followed by washing consecutively with aqueous sulfuric acid, water and aqueous ammonium hydroxide. The volatiles (methylene chloride and ethylene dichloride) were then removed by evaporation at reduced pressures to give a 93% yield (based on the amount of $PCl_3$ used) of product having a refractive index ($n_D^{22}$) of 1.4781. The product was identified by infrared spectrum (hereinafter referred to as IR) as being tetrakis(2-chloroethyl) ethylene diphosphate; and it was found to contain 31.34% chlorine and 12.55% phosphorus (compared to theoretical calculated percentages in $C_{10}H_{22}Cl_4O_8P_2$ of 30.08% chlorine and 13.14% phosphorus).

EXAMPLE 2

The amount of 15.5 moles of propylene oxide was reacted with 5.06 moles of phosphorus trichloride in 200 mls. of methylene chloride solvent, at 32–50° C. The reaction product was then directly reacted with 5.02 moles of chlorine gas at 30–40° C. The bis(2-chloroisopropyl) phosphorochloridate thus formed was directly reacted 2.4 moles of ethylene glycol in the presence of 4.8 moles of pyridine. An amount of 50 mls. of acetic anhydride was then added to the reaction mixture. At the end of the reaction, the product was washed consecutively with aqueous sulfuric acid, water and aqueous ammonium hydroxide. The volatiles (methylene chloride and propylene dichloride) were then removed from the phased organic solution by heating at reduced pressures. A 95% yield of product, having a refractive index ($n_D^{30}$) of 1.4637 and identified by IR as tetrakis(2-chloroisopropyl) ethylene diphosphate, was thus obtained. The product was found to contain 28.11% chlorine and 11.23% phosphorus (compared to theoretical calculated percentages in $$C_{14}H_{28}Cl_4O_8P_2$$

of 26.89% chlorine and 11.74% phosphorus).

EXAMPLE 3

A total of 1.1 moles of bis(2-chloroethyl) phosphite was reacted with 2.1 moles of carbon tetrachloride in the presence of 2 mls. of triethylamine. The bis(2-chloroethyl) phosphorochloridate thus formed was directly reacted with 0.5 mole of hydroquinone in the presence of 1.1 moles of pyridine. The reaction product was washed with aqueous sulfuric acid, water, and finally with aqueous ammonium hydroxide. After evaporating the carbon tetrachloride solvent and the chloroform which was formed, a 94% yield of product was obtained. This product had a refractive index ($n_D^{20}$) of 1.5093, and was identified by IR as tetrakis (2-chloroethyl) p-phenylene diphosphate. Upon analysis, the product was found to contain 28.05% chlorine and 12.55% phosphorus (compared to theoretical calculated percentages in $$C_{14}H_{20}Cl_4O_8P_2$$

of 27.31% chlorine and 11.92% phosphorus).

EXAMPLE 4

A total of 0.84 mole of bis(2-chloroethyl) phosphite was reacted with 1.56 moles of carbon tetrachloride in the presence of 2 mls. of triethylamine. The bis(2-chloroethyl) phosphorochloridate thus formed was reacted with 0.4 mole of resorcinol in the presence of 0.84 moles of pyridine. The procedure of Example 3 was followed in isolating a 76% yield of product which was identified by IR as tetrakis(2-chloroethyl) m-phenylene diphosphate. This product had a refractive index ($n_D^{25}$) of 1.5050; and, on analysis, was found to contain 28.61% chlorine and 11.85% phosphorus (as compared to theoretical calculated percentages in $C_{14}H_{20}Cl_4O_8P_2$ of 27.31% chlorine and 11.92% phosphorus).

EXAMPLE 5

A total of 0.68 mole of bis(2-bromoethyl) phosphite was reacted with excess carbon tetrachloride in the presence of a small amount of triethylamine. The bis(2-bromoethyl) phosphorochloridate thus formed was reacted with 0.31 mole of ethylene glycol in the presence of 0.68 mole of pyridine. The reaction product was washed with aqueous sulfuric acid, water, aqueous sodium bicarbonate, and again with water. The volatiles (chloroform and carbon tetrachloride) were removed by evaporation at reduced pressure to give a 100% yield of product identified by IR as tetrakis(2-bromoethyl) ethylene diphosphate. On analysis, the product was found to contain 49.83% bromine and 9.05% phosphorus (compared to calculated percentages in $C_{10}H_{20}Br_4O_8P_2$ of 49.23% bromine and 9.54% phosphorus).

EXAMPLE 6

The amount of 1.9 moles of bis(2-chloroethyl) phosphite was reacted with excess carbon tetrachloride in the presence of a small amount of triethylamine. The bis(2-chloroethyl) phosphorochloridate formed was reacted with 0.86 mole of 2-butene-1,4-diol in the presence of pyridine. The product was isolated in the manner described in the above examples to obtain a yield of 100%. Identified by IR as tetrakis(2-bromoethyl) 2,3-butene diphosphate, the product had a refractive index ($n_D^{22}$) of 1.4852 and contained 29.65% chlorine and 12.24% phosphorus (compared to calculated percentages in $C_{12}H_{22}Cl_4O_8P_2$ of 28.51% chlorine and 12.45% phosphorus).

EXAMPLE 7

A flexible polyurethane foam forming reaction mixture was prepared from the following ingredients in the indicated proportions:

| Ingredients: | Amount |
|---|---|
| Oxypropylated glycerin (mol. wt. 3,000) gms | 100.0 |
| Silicone surfactant (Dow Corning DC-190* mls | 1.5 |
| Triethylene Diamine mls | 0.5 |
| Water mls | 4.0 |
| Stannous octoate catalyst mls | 0.6 |
| Toluene diisocyanate (80/20 mixture of 2,4 and 2,6 isomers) mls | 41.0 |

*This surfactant is a block copolymer of polydimethylsiloxane and a polyester resin.

To this mixture 20.0 gms. of tetrakis(2-chloroethyl) ethylene diphosphate were added. Procedurally this was blended in with the oxypropylated glycerin before adding the other ingredients of the foam forming reaction mixture. The total mixture was then poured into an open-top box and allowed to expand into a flexible foam block which was oven-cured at 95° C. for about 10 minutes, followed by ambient temperature curing for about two days.

A small section of the foam was analyzed and found to contain 1.5% phosphorus and 3.6% chlorine.

The flammability of the foam was tested as described in ASTM-D1692-68. The extent of burning was found to be limited to 1.5 inches, using a standard foam sample 6 inches in length. In 29 seconds the flame was self-extinguished.

The non-fugitivity of the material was demonstrated by subjecting one portion of the foam to a humid-age test and another portion of the foam to a dry-heat-aging test. In the humid-age test, the material was baked in a 121° C. steam autoclave for about five hours. Thereafter, another flammability test, as described in ASTM-D1692-68, was conducted on the material. The test showed a slight decrease in flame-retardancy. The extent of burning was again limited to 1.8 inches, the flame being self-extinguished in 39 seconds.

In the dry-heat-aging test, the material was placed in a 140° C. air-oven for 22 hours. When flame tested thereafter, the material showed no fugitivity at all. The flame was again self-extinguished after consuming 0.8 inches of the sample.

In both the humid and the dry-heat-aging test, no extensive deterioration of the physical properties of the foam was observed; and the extent of discoloration occurring after aging was comparable to that observed for foam without the additive.

EXAMPLES 8–11

The same polyurethane foam-forming reaction mixture of Example 7 was used to prepare four foams, identified as E-8 through E-11. However, instead of the tetrakis(2-chloroethyl) ethylene phosphate used in Example 7, other phosphate diesters were added to the mixture, the identity and proportion of each diester being indicated in Table 1 below. The foams were then flame tested as described in ASTM-D1692-68. The results are recorded in Table 1.

TABLE 1

| Example No. | Phosphate diester used | PBW | ASTM-D1692-68 flame test |
|---|---|---|---|
| E-8 | Tetrakis(2-chloroethyl) m-phenylene diphosphate. | 20 | SE-2.0''* |
| E-9 | Tetrakis(2-bromoethyl) ethylene diphosphate. | 20 | SE-1.4'' |
| E-10 | Tetrakis(2-bromoethyl) ethylene diphosphate. | 30 | SE-1.2'' |
| E-11 | Tetrakis(2-chloroethyl) 2,3-butene-1,4-diphosphate. | 20 | SE-1.2'' |

*Self-extinguishing, extent of burn 2.0 inches.

EXAMPLE 12

Another foam sample, identified as E-12, was prepared using the polyurethane foam forming reaction mixture of Example 7, except that 10 parts of tetrakis(2-chloroethyl) ethylene diphosphate were employed. For purposes of comparison, two other foam samples, identified as C-1 and C-2, were prepared again using the foam forming reaction mixture of Example 7. In C-1, in place of the tetrakis(2-chloroethyl) ethylene diphosphate, 10 parts of diethylene glycol bis[bis(2-chloroethyl) phosphate] were incorporated in the reaction mixture; and in C-2, 10 parts of tetraethyl ethylene diphosphate were incorporated in the reaction mixture.

After foaming, each of E-12, C-1 and C-2, was subjected to a flammability test as described in ASTM-D1692-68. In the case of each of C-1 and C-2, the foam sample was entirely consumed by the flame. E-12, on the other hand, was found to be self-extinguishing, the extent of the burn being 2 inches.

The above example demonstrates the efficient flame retardancy of the diesters used according to the invention at low levels (10 parts) when compared with two known and otherwise similar phosphorus esters.

EXAMPLE 13

A foam sample, identified as E-13, was prepared using the polyurethane foam forming reaction mixture of Example 7, with 20 parts of tetrakis(2-chloroethyl) ethylene diphosphate added. Again, for purposes of comparison, three other foam samples, identified as C-3, C-4, and C-5, were prepared using the foam forming reaction mixture of Example 7. In place of the tetrakis(2-chloroethyl) ethylene diphosphate, in C-3, 20 parts of tetrakis (2-chloroethyl) ethylene diphosphonate were added to the reaction mixture; in C-4, 20 parts of tris(2-chloroethyl) phosphate were added; and in C-5, 20 parts of tris(2,3- dichloropropyl) phosphate were added. All of the samples were subjected to a dry-heat-aging test, as described in Example 7. The samples were then examined for the condition of the foam and flame tested as described in ASTM-D1692-68. The results are recorded in Table 2 below.

TABLE 2

| Foam sample | Foam condition | Flame test |
|---|---|---|
| E-13 | Good | SE-1.5''*. |
| C-3 | Deteriorated | |
| C-4 | Good | B**. |
| C-5 | do | B**. |

*Self-extinguishing, extent of burn 1.5 inches.
**Burned through.

This example demonstrates the superiority of the diesters used according to the invention when compared with known and otherwise similar halogenated phosphorus esters, as regards non-fugitivity and absence of adverse effects on the foam as a result of aging.

EXAMPLES 14–19

Six illustrative foam samples, identified as E-14 through E-19, and two comparison foam samples, identified as C-6 and C-7, were prepared using the basic polyurethane foam forming reaction mixture of Example 7. The foam samples varied with respect to the identity or amount of flame retardant additive used in preparing each of them. Thus in preparing E-14 and E-15, 10 and 15 parts, respectively, of tetrakis(2-chloroethyl)ethylene diphosphate were used; in preparing E-16 and E-17, 10 and 15 parts, respectively of tetrakis(2-chloroisopropyl) ethylene diphosphate were used; in preparing E-18 and E-19, 10 and 15 parts, respectively, of tetrakis(2-chloroethyl)butylene diphosphate were used; and in preparing comparison samples C-6 and C-7, 10 and 15 parts, respectively, of a prior art flame retardant, bis(chloromethyl)-1,3-propylene-bis[bis(2-chloroethyl)phosphate] were used.

Each of the eight foam samples was subjected to the flammabiilty test described in ASTM-D-1692-68. The results are provided in Table 3 below.

amount of a halogenated phosphate diester having the formula:

$$\begin{array}{c} R'O \\ \diagdown \\ R'O \end{array} \!\! \begin{array}{c} O \\ \| \\ P \end{array} \!\! -O-R-O- \!\! \begin{array}{c} O \\ \| \\ P \end{array} \!\! \begin{array}{c} OR' \\ \diagup \\ OR' \end{array}$$

wherein R is an aliphatic hydrocarbon radical having from 1 to about 8 carbon atoms, and each R' is independently a haloalkyl radical having from 1 to about 8 carbon atoms.

2. The polyurethane foam of claim 1 wherein each of said haloalkyl radicals represented by R' contains 1 or 2 halogen atoms.

3. The polyurethane foam of claim 2 wherein all of said haloalkyl radicals represented by R' are identical, each such radical containing 2–4 carbon atoms.

4. The polyurethane foam of claim 3 wherein said radical represented by R is an aliphatic radical having from 1 to about 4 carbon atoms.

5. The polyurethane foam of claim 4 wherein said aliphatic radical contains 2–4 carbon atoms.

6. The polyurethane foam of claim 5 wherein each of said haloalkyl radicals represented by R' contains one halogen atom.

7. The polyurethane foam of claim 6 wherein said halogenated phosphate diester is selected from the group consisting of tetrakis(2-chloroethyl) ethylene diphosphate, tetrakis(2-bromoethyl) ethylene diphosphate, tetrakis(2-chloroethyl) - 2,3 - butene-1,4-diphosphate, tetrakis(2-chloroethyl) butylene diphosphate, and tetrakis(2-chloroisopropyl) ethylene diphosphate.

8. The polyurethane foam of claim 7 wherein said halogenated phosphate diester is tetrakis(2-chloroethyl) ethylene diphosphate.

9. The polyurethane foam of claim 1 wherein said reaction mixture comprises a polyether polyol, an organic polyisocyanate, a foaming agent and a reaction catalyst.

10. A flexible polyurethane foam as claimed in claim 9 wherein said polyether polyol is an oxyalkylated poly-

TABLE 3

| Foam sample | Flame retardant additive used | Amount | Flame test results ASTM-D-1692-68) Rating | Ext. of burn (in.) |
|---|---|---|---|---|
| E-14 | Tetrakis(2-chloroethyl)ethylene diphosphate | 10 | S.E. | 2.4 |
| E-15 | do | 15 | S.E. | 2.1 |
| E-16 | Tetrakis(2-chloroisopropyl)ethylene diphosphate | 10 | S.E. | 4.3 |
| E-17 | do | 15 | S.E. | 2.3 |
| E-18 | Tetrakis(2-chloroethyl)butylene diphosphate | 10 | S.E. | 3.6 |
| E-19 | do | 15 | S.E. | 2.5 |
| C-6 | Bis(chloromethyl)-1,3-propylene-bis[bis(2-chloroethyl)-phosphate]. | 10 | B | (¹) |
| C-7 | do | 15 | S.E. | 3.2 |

¹ Burned through.

The data in Table 3 further demonstrates the improved flame retardancy of the polyurethane foams of the invention. As shown, all seven foam samples E-14 through E-19, incorporating 10 or 15 parts of various flame retardants used according to the invention, were rated as self-extinguishing; whereas of the two foam samples C-6 and C-7, incorporating a similar prior art flame retardant, only C-6, which contains 15 parts of that flame retardant, was rated as self-extinguishing. The foam sample C-7, incorporating 10 parts of the prior art flame retardant, was found to be burning.

What is claimed is:

1. A polyether polyurethane foam prepared from a reaction mixture which comprises a flame retarding hydric alcohol having a molecular weight of about 2000–7000.

11. The polyurethane foam of claim 10 wherein said R is an aliphatic radical having 2–4 carbon atoms, and all said haloalkyl radicals R' are identical.

12. The polyurethane foam of claim 11 wherein said haloalkyl radicals R' are monohaloalkyl having 1–4 carbon atoms.

13. The polyurethane foam of claim 12 wherein said organic isocyanate is toluene diisocyanate.

14. The polyurethane foam of claim 13 wherein said halogenated phosphate diester is selected from the group consisting of tetrakis(2-chloroethyl) ethylene diphosphate, tetrakis(2-bromoethyl) ethylene diphosphate, tetrakis(2- chloroethyl) - 2,3 - butene - 1,4-diphosphate, tetrakis(2-chloroethyl) butylene diphosphate, and tetrakis(2-chloroisopropyl) ethylene diphosphate.

15. The polyurethane foam of claim 14 wherein said oxyalkylated polyhydric alcohol has a molecular weight of about 2500–6000.

16. The polyurethane foam of claim 15 wherein said oxyalkylated polyhydric alcohol is oxypropylated glycerin.

17. The polyurethane foam of claim 16 wherein said reaction catalyst comprises stannous octoate.

18. The polyurethane foam of claim 17 wherein said reaction mixture also comprises a silicone surfactant.

19. The polyurethane foam of claim 18 wherein said foaming agent is water and wherein stannous octoate and triethylene diamine are employed as catalysts in said reaction mixture.

20. The polyurethane foam of claim 19 wherein said diester is tetrakis(2-chloroethyl) ethylene diphosphate.

References Cited

UNITED STATES PATENTS

| | | | |
|---|---|---|---|
| 3,157,613 | 11/1964 | Anderson | 260—45.7 P |
| 3,706,821 | 12/1972 | Anderson | 260—45.7 P |

DONALD E. CZAJA, Primary Examiner

C. W. IVY, Assistant Examiner

U.S. Cl. X.R.

260—2.5 AP, 45.7 P